(12) United States Patent
Haatainen

(10) Patent No.: US 8,515,667 B2
(45) Date of Patent: Aug. 20, 2013

(54) POWER SAVING SYSTEM FOR NAVIGATION DEVICE

(75) Inventor: Niko Haatainen, Nilsia (FI)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 206 days.

(21) Appl. No.: 12/247,571

(22) Filed: Oct. 8, 2008

(65) Prior Publication Data

US 2009/0043491 A1 Feb. 12, 2009

Related U.S. Application Data

(63) Continuation of application No. 11/162,170, filed on Aug. 31, 2005, now abandoned.

(51) Int. Cl.
G01C 21/00 (2006.01)
H04B 1/38 (2006.01)
G01S 19/34 (2010.01)
G01S 13/00 (2006.01)

(52) U.S. Cl.
USPC ....... 701/432; 455/574; 342/357.74; 342/176

(58) Field of Classification Search
USPC ............. 701/1, 200, 201, 207–211, 408, 409, 701/410, 411, 412, 413, 414, 428, 429, 431, 701/432, 436, 490; 340/539.11, 539.13, 340/539.3, 929, 995.1–996, 955, 953, 956, 340/518, 539.2, 3.6, 5.32, 815.43, 815.56, 340/815.65, FOR. 400; 455/574, 343.1–345; 348/333.01, 333.13, 333.03; 342/139, 104, 342/118, 176, 185, 357.74
See application file for complete search history.

(56) References Cited

U.S. PATENT DOCUMENTS

| | | | |
|---|---|---|---|
| 5,592,173 A * | 1/1997 | Lau et al. | 342/357.74 |
| 6,141,568 A | 10/2000 | Sakaguchi | |
| 6,684,083 B1 | 1/2004 | Harimoto | |
| 6,891,525 B2 | 5/2005 | Ogoro | |
| 2004/0048600 A1 | 3/2004 | Madour | |
| 2004/0048620 A1* | 3/2004 | Nakahara et al. | 455/456.1 |
| 2004/0167802 A1* | 8/2004 | Takada et al. | 705/2 |
| 2005/0124389 A1* | 6/2005 | Yang | 455/574 |
| 2005/0202801 A1* | 9/2005 | Banet et al. | 455/404.1 |

* cited by examiner

*Primary Examiner* — Muhammad Shafi
(74) *Attorney, Agent, or Firm* — Fay Sharpe LLP

(57) ABSTRACT

A navigation system using a mobile terminal, GPS receiver and navigation software, wherein the navigation software is arranged to switch the mobile terminal into a power saving mode if there are no further instructions needed for a determined period of time or distance. The power saving functionality comprises turning the backlight off and changing the visualization of the display for better readability without the backlight.

4 Claims, 2 Drawing Sheets

POWER SAVING SYSTEM FOR NAVIGATION DEVICE

This application is a continuation of U.S. application Ser. No. 11/162,170, filed Aug. 31, 2005 now abandoned, the disclosure of which is incorporated herein by reference.

FIELD OF THE INVENTION

The invention relates to power management of navigation devices. Particularly the invention relates to portable navigation devices that have a display device and a low capacity battery.

BACKGROUND OF THE INVENTION

Published US application number 2004/0048600, assigned to Hitachi Ltd., discloses a power saving management for a navigational device. The system according to said application discloses a system comprising a mobile device with navigation software and a receiver for receiving location information from Global Positioning System (GPS). Furthermore, the mobile device has telecommunication means for contacting the navigation server for downloading navigation information. The user of the disclosed system inputs the desired destination to the mobile device. As on response the system requests the current location coordinates of the mobile device from the GPS receiver and sends the coordinates and the destination to the navigation server. The navigation server calculates the route from the current location to the destination and sends the route information back to the mobile device. The route information is constructed from the map information comprising a road network. The road network is modeled as a weighted graph that includes further information depending on traffic rules, for example, prohibited directions. Besides the weight that typically is a classification for a road or street, the edges of the graph have a length that equals to the length of a road or street segment between two junctions.

A common problem with the implementations as described above is that mobile devices do have restricted time of operation because of high power consumption and low power capacity. The application mentioned above suggests a solution wherein the display device of mobile device is turned off when there is no need for further navigation information. For example, if further information is required only after 15 minutes of driving, the display device can be turned off until the next instructions. This allows major power saving as the display device is typically the most power demanding unit in a mobile device.

The problem with the above mentioned solution is that when the display is turned off, the user does not have any information about the route. The user does not know the distance to the next turn nor has any other information about the route. This can be a major drawback if the navigation system does not have all the information of the route and the user has to cope with this by making the right decisions. This is common, for example, in the case of road construction. Furthermore, usually the drivers are willing to consult a map and obtain other information about the route.

SUMMARY OF THE INVENTION

The invention discloses a power efficient navigation method, system and software for navigation devices, particularly for mobile phones that are equipped with navigation software and positioning means. Furthermore, the navigation device has common means required for executing a program, such as a central processing unit and a memory. However, these are common features in mobile devices and are not presented herein they are well known to a person skilled in the art.

In the implementation according to the present invention, the navigation is initiated by requesting a route. For requesting the route the navigation software requests the desired destination from the user. Furthermore, the navigation software requests the current location of the navigation device. Typically a GPS receiver is used for providing accurate location coordinates. The GPS receiver can be a built-in receiver or external receiver that has been connected to the navigation device. The connection between the navigation device and the GPS receiver may be wireless.

With the current location and the destination information a route is computed. The route can be computed in the navigation device or by an external server. The computed route is displayed to the user and driving instructions to the destination are given on the display and/or in the form of speech. A power saving function is initiated if there is no need to display information for predetermined threshold time or distance, for example two minutes. The navigation software computes a span value required to reach the next point where guidance is needed. If the span exceeds the threshold value of time or distance, the device can be switched into the power saving mode. Typically the device has an independent power saving function similar to screen savers in computers. If there is no user activity for a certain period time, the power management mode is activated even if the information on the display changes during this time. This can be avoided by sending an activation signal to the power management at regular intervals. If the span value exceeds the threshold value, the activation signal is not sent and the device goes into the power saving state after a period of time determined by the operating system of the device.

In a further embodiment the colors of the display and other visualization can be changed when the device is switched into power saving. This is because the regular visualization is designed for the backlight and is not readable when the backlight is turned off in the power saving mode. Thus, there is a need for a change, for example, in the coloring, font size and/or size of visual guidance icons so that it can be read better without the backlight. The invention discloses an implementation that is particularly beneficial in small navigation devices that have low power capacity. Compared to the prior art solution a similar power saving is gained while still maintaining the visual information available.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
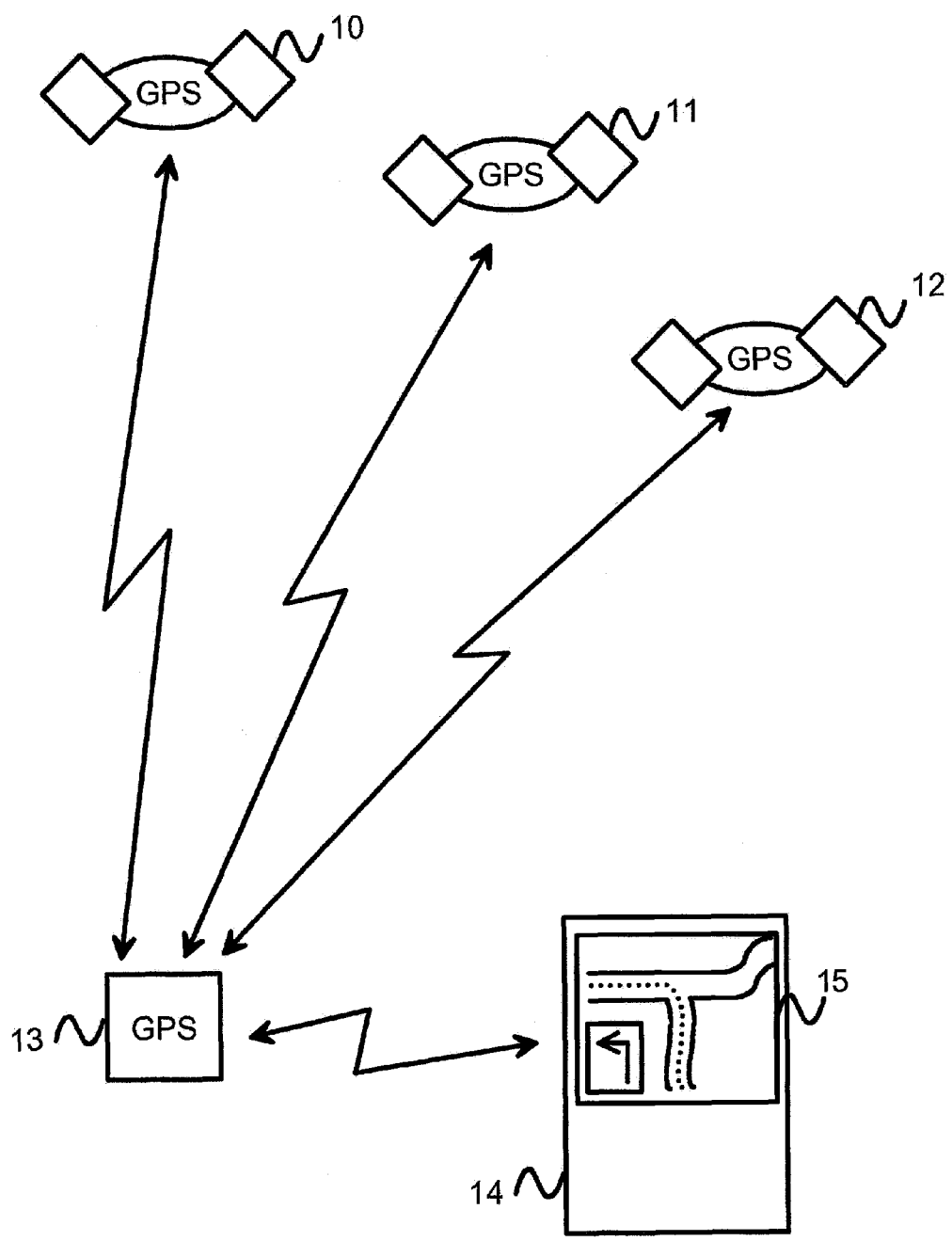
FIG. 1 is an example embodiment of the system according to the invention.

In FIG. 1 an illustration of a navigation system according to the invention is provided. In the embodiment of FIG. 1 there is no need for external servers but the navigation device 14 comprises all the information and software required for computing the route even if the navigation device is, in most cases, a cellular phone or PDA device that has network connectivity means. This kind of implementation is known as on-board design. In off-board implementations the route is computed in a separate navigation server that sends the information back to the navigation device. Both of the implementations have their benefits and most likely a hybrid-implementation with combination of on-board and off-board characteristics will be implemented in the future.

In the example of FIG. 1 the navigation device 14 does not have a built-in positioning device but is connected wirelessly to a GPS receiver 13 that computes the exact location of the receiver 13 from the observations received from the GPS-satellites 10, 11 and 12. The GPS system is used in this example because it is most commonly used, exact and because there are plenty of hardware implementations. However, for the power saving features according to the present invention any kind of positioning system is acceptable.

Figure 2:
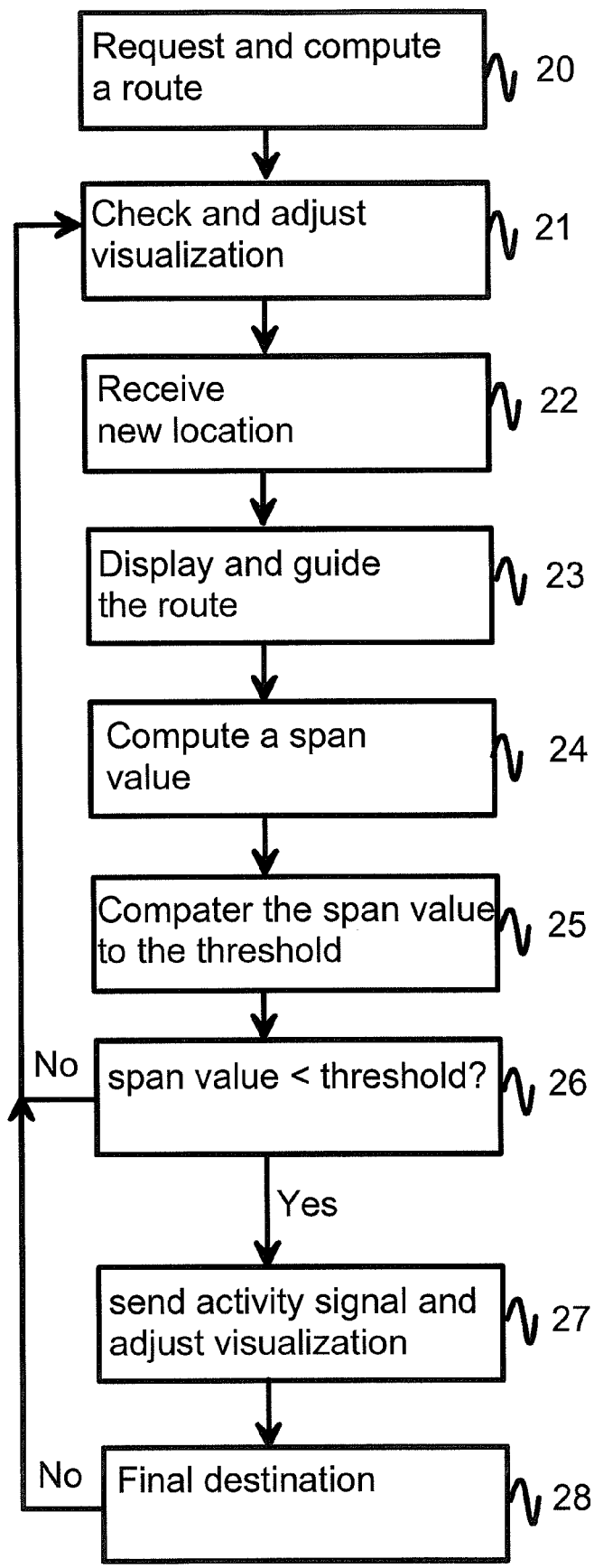
FIG. 2 is a flow chart of a method according to the invention.

The present invention relates to power saving in a navigation system according to FIG. 1. The user of the navigation device 14 starts navigation by entering the desired destination of the route. The navigation device 14 requests the exact location of the device from the GPS receiver 13. Based on the map information, the navigation device 14 computes the route between the origin and the destination and controls a display 15 based thereon. The display 15 uses display indicia such as various colors, front size and size for the icons to display the map information. A background light (backlight) may be used to illuminate the display 15. The map information can be an on-board implementation or retrieved from a server. Practically, the map information comprises nodes and edges that represent junctions and road and/or street segments between the junctions. The nodes and edges can have additional information, such as speed limits, other traffic rules and other related information. When the user arrives at a junction the navigation device instructs how the user should continue. Typically in most of the junctions there is no need for further instructions as the user continues straight forward. Thus, a method according to FIG. 2 is used for power saving when there are no instructions needed. In power saving mode the display indicia and backlight may be controlled. Furthermore, the navigation device has common means that are required for executing a program, such as a central processing unit and memory. However, these are common features in mobile devices and are not presented herein they are well known to a person skilled in the art.

In FIG. 2, the user first starts the navigation by choosing the destination. The route is computed on-board or off-board, step 20. When the guiding is started the navigation device is typically active and the backlight is on. However, it might be beneficial to adjust the inactivity timeout a bit longer when starting the route, step 21. This is to guarantee that the user of the device has time to start driving and actually starts moving on the route. While moving on the route, the navigation device continuously receives the new location of the device, step 22. This moving is shown on the route display and further instructions may be given for following the route, step 23.

While moving on the route the navigation device computes a span value, step 24. The span value corresponds with the distance to the next junction that requires further instructions. This can be measured as a distance or as a time if the average speed and speed limits are known. The span value is then compared to a threshold value, step 25. The threshold value may be user determined. For example, if a driver wishes to have a warning of further instructions one minute before the actual instructions, the navigation device approximates the distance the user travels in one minute time and then compares the actual distance to the computed one. The threshold value may be different during the route depending on the road classification. Thus, in the cities the warning can come later and in highways earlier as also the traffic signs appear earlier along the highways.

If the span value exceeds the threshold value, the navigation procedure continues by jumping back to step 21. First the navigation device checks the visualization. If the navigation device has been inactive and switched into power saving mode, the visualization parameters should be changed. This is because the normal colors and font size are hard to see when the backlight is turned off. The font size and actual colors depend on the display of the navigation device and may be implemented so that the user may tune them according to their own preferences.

If the span value is less than the threshold the next junction requiring guidance is close. Thus, an activity signal must be sent to the power saving management of the device, step 27. Similarly, if the power saving visualization has been activated, the colors and font sizes are changed back to normal. In the normal visualization mode more information can be presented on the display while maintaining the readability. If the next guidance point is the final destination the navigation procedure can be ended, step 28. If the next guidance point is a junction requiring further instructions, the procedure is continued by jumping to step 21.

In a preferred embodiment the implementation comprises a cellular phone that is capable of executing a navigation software application. The navigation device has been connected to a GPS receiver with a wireless connection, such as Bluetooth®, or has been built into the navigation device. The navigation database is typically stored on a memory card but can be downloaded by using the data communication features of the cellular phone. Data communication features, that are typically packet switched, can be used for retrieving the additional information even if the navigation database is on the memory card.

In the preferred embodiment the actual power saving functionality is implemented as software features. During the guidance the software controls the power saving management of the navigation device. If the next guiding point is not close enough, the power saving mode is turned on. This is achieved by computing a span value to the next guidance point and comparing it to a predetermined threshold value. If the span value exceeds the threshold value, the software can activate the power saving mode. The activation can be a call signal for activating the power saving but normally the power saving management is independent and activates itself after certain time of user inactivity. In this case, the normal mode is maintained by sending an activity signal to power saving management and the power saving is turned on by stopping said sending. Thus, after a certain time of inactivity, the navigation device automatically goes into power saving mode. Later when the threshold value exceeds the span value the activity signal is sent again and the navigation device is turned on. Furthermore, it is possible to configure the application so that during the power saving mode the visualization of the map is changed so that it can be better seen from the display without the backlight. This means that the colors of the map, font size and/or size of visual guidance icons have to be changed when the power saving mode is activated.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A power saving navigation device comprising a display, the device being capable of acquiring the current location of the device and a user specified desired destination, the device further arranged to:
    request navigation information for a route based on the acquired current location and the desired destination;
    display said requested route on said display of said navigation device and guiding a user along said route;
    determine a span value for the next expected guiding information;
    determine a threshold value for power saving management, wherein said threshold includes at least one of a predetermined time and distance;
    compare said span value to said threshold value; a processor is configured to activate the power saving mode if said span value exceeds said threshold value,
    wherein said power saving mode comprises turning off the background light of the display of said navigation device and changing at least one display indicia, said at least one display indicia including one or more of a map and visual guidance icons, wherein changing said at least one display indicia includes changing one or more of the colors of a map, font size, font color, and size of visual guidance icons, such that the at least one display indicia can be seen without a backlight, wherein the power saving mode is an independent feature of said device that is being activated by the processor after a certain time of inactivity, wherein said device compares said span value to said threshold value and sends an activity signal when said threshold value exceeds said span value.

2. A navigation device according to claim 1, wherein the navigation device comprises a built-in GPS receiver.

3. A navigation device according to claim 1, wherein the navigation device is coupled to a separate GPS receiver.

4. A device according to claim 1, wherein the next expected guiding information comprises a junction requiring instruction.

* * * * *